United States Patent [19]

Thacker et al.

[11] Patent Number: 4,660,685
[45] Date of Patent: Apr. 28, 1987

[54] DISC PAD BRAKE SYSTEM

[76] Inventors: Lloyd M. Thacker, 3 Scottsdale Ct., Lutherville, Md. 21093; Richard D. Stevenson, 826 Lucky Rd., Severn, Md. 21144

[21] Appl. No.: 801,585

[22] Filed: Nov. 25, 1985

[51] Int. Cl.[4] .......................................... F16D 65/02
[52] U.S. Cl. ............................. 188/73.37; 188/250 E
[58] Field of Search ................. 188/73.1, 73.35, 73.36, 188/73.37, 250 B, 250 E, 251 R, 251 A, 256

[56] References Cited

U.S. PATENT DOCUMENTS

| | | | |
|---|---|---|---|
| 3,490,563 | 1/1970 | Hahm | 188/73.37 |
| 3,730,302 | 5/1973 | Ogawa et al. | 188/73.37 |
| 3,918,555 | 11/1975 | Rath | 188/73.37 |
| 4,055,238 | 10/1977 | Haraikawa et al. | 188/73.37 |

FOREIGN PATENT DOCUMENTS

| | | | |
|---|---|---|---|
| 2913994 | 10/1979 | Fed. Rep. of Germany | 188/73.37 |
| 0141954 | 11/1975 | Japan | 188/73.37 |

Primary Examiner—Duane A. Reger

Attorney, Agent, or Firm—Morton J. Rosenberg

[57] ABSTRACT

A disc pad brake system (10) is provided for longitudinally displacing one or more friction pads (14) into force contact with a rotating disc member (12). A caliper assembly (24) includes a caliper housing (26) within which there is displaceably mounted a piston member (18) having a bore (20). The piston member (18) is longitudinally displaceable in a reversible manner for contacting and displacing the friction pads (14) into contact with the disc member (12). The caliper assembly (24) includes a pair of carrier plates (28) having opposing first and second surfaces (30 and 32) with the first surface (32) of the carrier plate (28) being coupled in fixed fashion to the friction pads (14). At least one resilient pad member (34) is displaceably secured to the second surface (32) of the carrier plate (28) for contacting the piston member (18) during a braking operation. The resilient pad member (34) provides for vibrational damping and lowers the frequencies induced when the friction pads (14) contact the disc members (12) to lessen the audio output of the braking operation.

17 Claims, 2 Drawing Figures

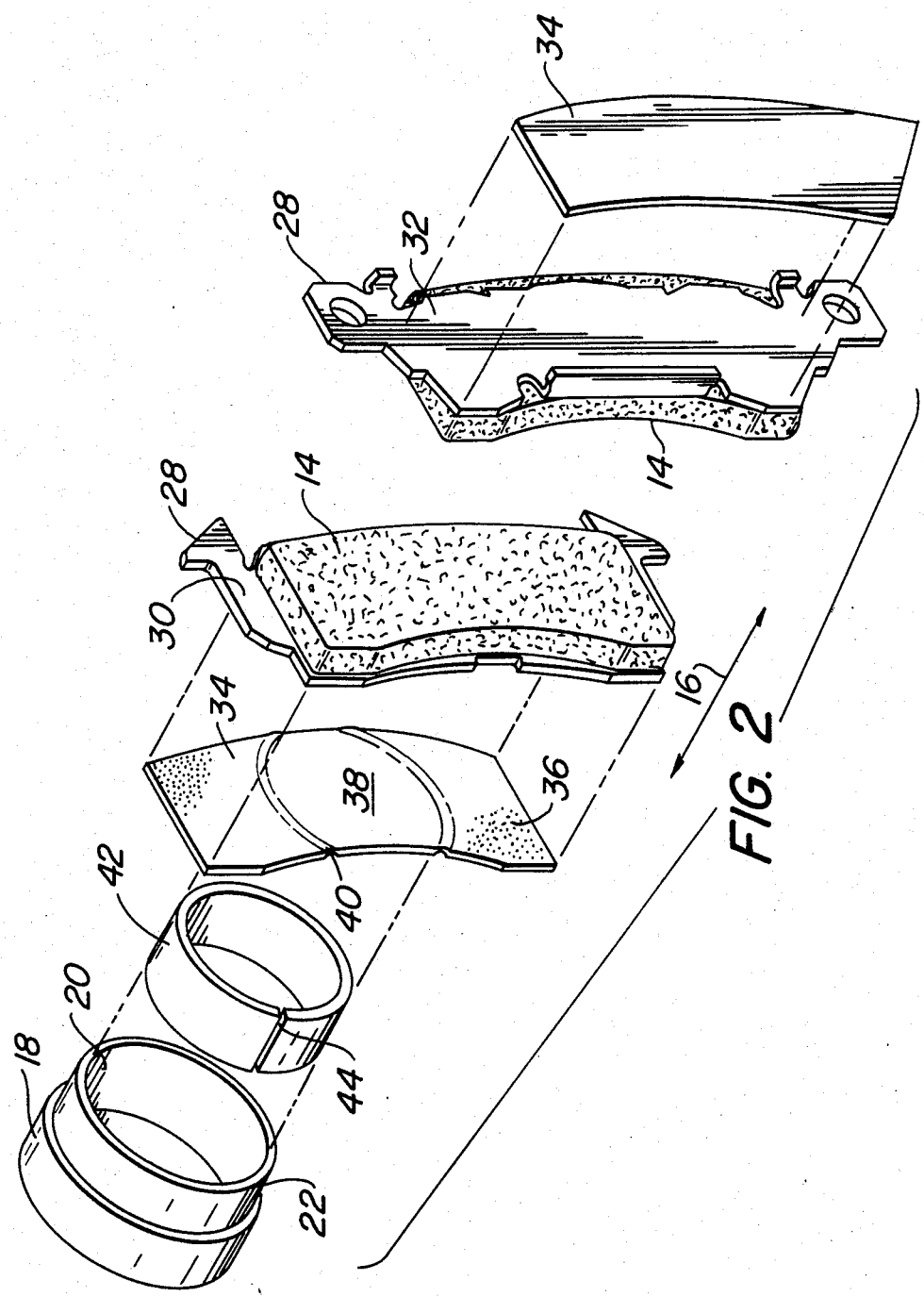

DISC PAD BRAKE SYSTEM

BACKGROUND OF THE INVENTION

1. Field of the Invention

This invention is directed to brake systems used generally in vehicles. In particular, this invention is directed to disc pad brake systems for lowering the audio output of a braking operation. Still further, this invention pertains to a disc pad brake system where a resilient pad member is inserted between an operating longitudinally displaceably piston and at least one carrier plate member within a caliper assembly. More in particular, this invention relates to a disc pad brake system which includes a resilient pad member formed of substantially fluorine substituted alkyl polymer and in particular, poly-hexfluoroethylene. Still further, this invention relates to a disc pad brake system where the resilient pad member is partially secured to a respective carrier plate member and has a dome-shaped portion partially insertable within a bore of an actuating piston. Further, this invention relates to a disc pad brake system utilizing a resilient insert damper member mounted in a loosely fit manner within the bore of a longitudinally actuated piston member.

2. Prior Art

Systems for reducing braking noises are well-known in the art. Numerous prior art systems direct themselves to systems for reducing brake squeal which has been found to be objectionable. However, in general, such prior art systems have not provided a comprehensive brake squeal eliminator system.

The best prior art known to Applicants include U.S. Pat. Nos. 3,566,995; 4,230,207; 4,064,975; 4,022,302; 4,154,322; 4,373,615; 4,240,530; 3,378,116; 4,103,761; 3,966,026; 3,162,271; 3,490,563; 3,498,423; 3,460,652; 4,527,668; 4,485,898; and, 3,848,708.

U.S. Pat. No. 4,022,302 is directed to disc brake pads for the purpose of eliminating braking vibrations and to eliminate brake squeal. In this reference, a layer of latex is used to reduce brake noise and eliminate brake squeal, however, after repeated braking operations, the piston member acting on the latex coating wears through the latex coating and there is a re-establishment of the brake squeal. Additionally, this prior art system is directed to an entire pad assembly that would require the replacement of the pad in place of the existing pad when the latex coating is worn away.

U.S. Pat. No. 3,378,116 is directed to friction pads for disc brakes and in particular is directed to a vibration damping element system. However, this system includes a backing plate which is provided with a recess containing a disc vibration damping material inserted therein. Thus, when the brake pad is worn out, a replacement of the entire pad must be made which increases the cost as well as time for installation.

U.S. Pat. No. 4,154,322 is directed to a squeal preventing disc brake pad assembly which uses a wire mesh screen sandwiched between a backing plate and a shim for contact by a brake piston. However, by the mere composition of the wire mesh screen, such does not permit the releasable locking of a resilient pad member partially within a bore of the actuating piston and requires extensive hardware considerations to mount such a screen in a locking manner to the backing plate.

SUMMARY OF THE INVENTION

A disc pad brake system for longitudinally displacing at least one friction pad into force contact with a rotatively displaceable rotor member. The disc pad brake system includes at least one piston member having a bore with the piston member being reversibly and longitudinally displaceable for displacing the friction pad into contact with the rotating rotor member. At least one carrier plate member is included having opposing first and second surfaces with the first surface of the carrier plate member being coupled to the friction pad. At least one resilient pad member is displaceably secured to the second surface of the carrier plate member with the piston member contacting the resilient pad member when the piston member is actuated in the longitudinal direction.

BRIEF OESCRIPTION OF THE DRAWINGS

FIG. 1 is a frontal view partially in cut-away of the disc pad brake system; and, FIG. 2 is a perspective exploded view of the piston member, resilient insert damper member, resilient pad member, and the combined carrier plate and friction pad assembly of the disc pad brake system.

DESCRIPTION OF THE PREFERRED EMBODIMENTS

Figure 1:
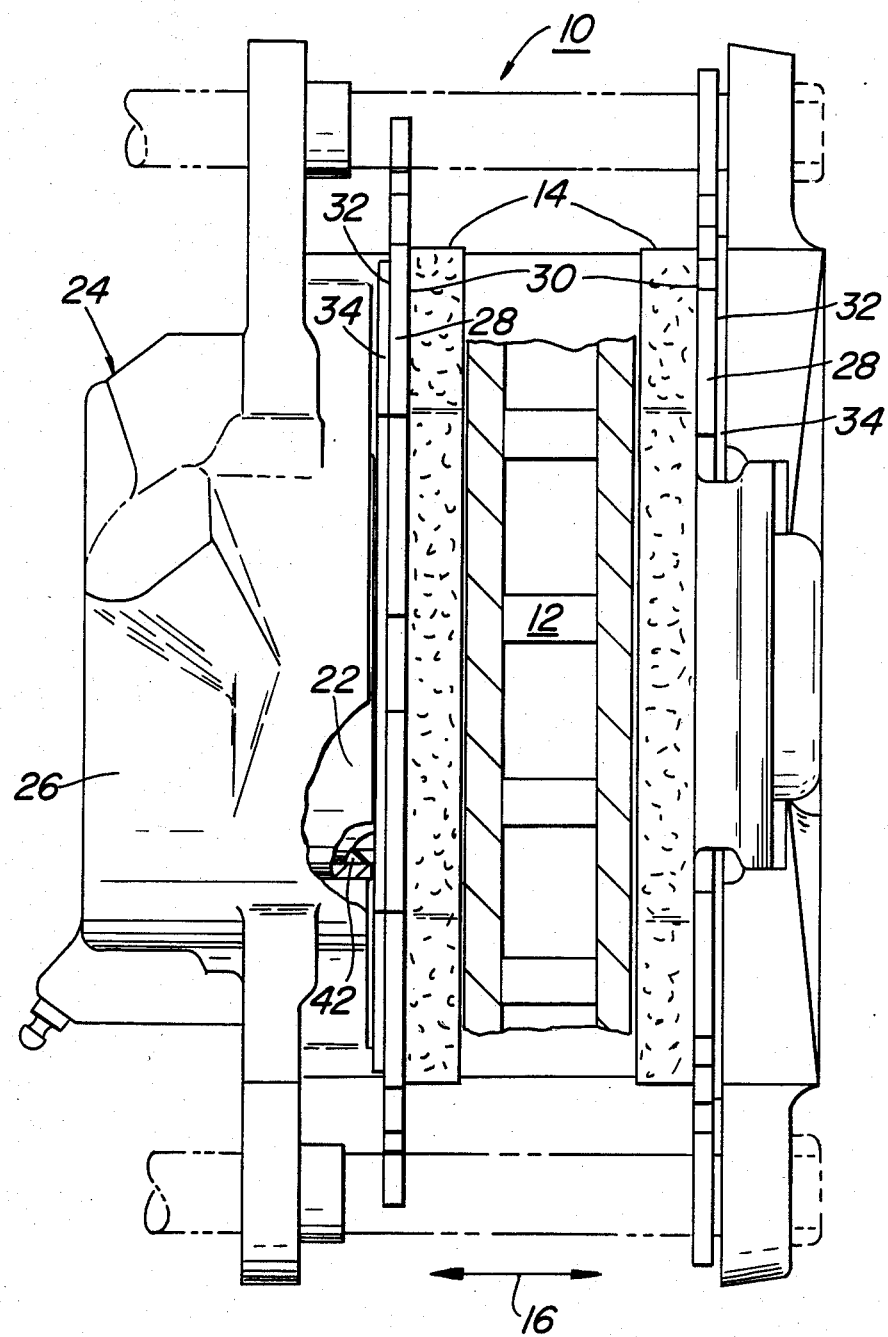

Referring now to FIGS. 1 and 2, there is shown disc pad brake system 10 for displacing at least one friction pad 14 into force contact with a rotatively displaceable rotor or disc member 12. Friction pad 14 is displaced in reversible longitudinal direction 16 as is shown in FIG. 2. In overall concept, disc pad brake system 10 is utilized to minimize audio output during a braking operation when friction pads 14 come into contact with disc or rotor member 12. As has been found in numerous prior art systems, the friction between brake disc 12 and friction pads 14 may cause vibrations during the braking operation which may be transferred from friction pads 14 to the brake cylinder and associated mountings. Such vibrations in the past produce braking noises in the form of squeals and have been found to be objectionable. It is the main purpose and objective of the subject invention concept to reduce the level of audio output when one or more friction pads 14 are displaced into force contact with disc or rotor member 12 during braking operations.

It is to be understood that various braking systems include single or double piston actuated brakes. In double piston brake systems, both friction pads 14 are longitudinally displaced into contact with disc or rotor member 12 on opposing sides thereof. For purposes of illustration and description of the invention concept, FIGS. 1 and 2 are directed to a single piston brake system wherein one of friction pads 14 is moved into force contact with rotor member 12 while the remaining friction pad 14 is essentially stationary. The invention concept as herein described directs itself to either single or double piston braking systems however, for the purposes of clarity, a single piston brake system will be detailed in following paragraphs.

Disc pad brake system 10 includes at least one piston member 18 having bore 20 with piston member 18 being reversibly displaceable in longitudinal direction 16 for displacing friction pad 14 into contact with rotating disc or rotor member 12. Piston member 18 may be hydraulically driven in longitudinal direction 16 or otherwise displaced in longitudinal direction 16 as is well-known in the art and not important to the inventive concept as herein described, with the exception that piston member 18 be force driven in longitudinal direction 16 with sufficient force loading to drive friction pad 14 against disk member 12 for braking purposes.

For purposes of clarity and conformance with the automotive industry, caliper assembly 24 includes caliper housing 26 in combination with hydraulically operated piston member 18 as well as carrier plates 28 and friction pads 14.

Disc pad brake system 10 includes carrier plate members 28 having opposed first and second surfaces 30 and 32. First surface 30 of each of carrier plate members 28 is coupled or secured to a respective friction pad member 14. Coupling may be through adhesive bonding, bolting, or some like technique, not important to the inventive concept as herein described, with the exception that each of carrier plate members 28 is fixedly secured to a respective friction pad member 14.

Disc pad brake system 10 further includes resilient pad members 34 which are displaceably secured to second surfaces 32 of respective carrier plate members 28. Piston member 18 contacts resilient pad members 34 when piston member 18 is actuated in longitudinal direction 16.

Of extreme importance to the subject invention concept is that resilient pad members 34 are formed of a substantially fluorine substituted alkyl polymer and in particular, may be formed of a poly-hexafluoroethylene composition. This type of chemical composition is commercially available under the Trademark Teflon. Each of resilient pad members 34 include a thickness within the approximating range of 0.005-0.050 inches and in a particular preferred embodiment, the thickness of resilient pad members 34 approximates 0.036 inches in thickness. The thickness of flexible resilient pad members 34 is of importance due to the fact that piston member 18 will only be displaced in longitudinal direction 16 by a small distance in the order of 0.002-0.010 inches. Resilient pad members 34 thus provide for a shim which is resilient in nature and compressible responsive to the composition qualities of resilient pad members 34. Additionally, the overall contours of resilient pad members 34 generally are formed in a concurrent or congruent manner with respect to the overall contour of second surfaces 32 of carrier plate members 28.

For installation purposes, resilient pad members 34 may be adhesively bonded to respective second surfaces 32 through adhesive cement 36, either applied to a surface of resilient pad members 34 or alternatively to second surfaces 32 of carrier plate members 28. The adhesive used may be a weather strip cement, or other commercially available adhesive to provide the necessary stability between resilient pad members 34 and carrier plate members 28 during installation processes.

During a braking operation, piston member 18 moves into contact with resilient pad member 34 and heat and pressure are applied. Adhesive 36 remains securely fixed to the metal second surface 32 of carrier plate member 28 however, a portion of resilient pad member 34 is displaced away from carrier plate second surface 32, as will be described in following paragraphs. Thus, resilient pad member 34 is compressed against second surface 32 of carrier plate member 28 in a contour substantially coinciding with a contour of sidewalls 22 of piston member 18 defining an inner portion 38 of resilient pad member 34 as is seen in FIG. 2. By contact of the upper edge of sidewalls 22, resilient pad members 34 are compressed in compression area 40 from a thickness approximating 0.036 inches to a thickness of 0.010 inches.

In operation, inner portion 38 separates from second surface 32 and is substantially dome shaped and partially extends internal bore 20 of piston member 18. The bulge or dome shape of inner portion 38 extends partially internal bore 20 and provides for a floating lock to piston member 18 during all phases of the operation of disc pad brake system 10.

Disc pad brake system 10 further includes resilient insert damper member 42 which is insertable within bore 20 of piston member 18. Resilient insert damper member 42 releasably contacts an internal surface of sidewalls 22 of piston member 18 to further change the frequency of operation and substantially aids in reducing any audio output during braking operations.

Resilient insert damper member 42 may be a sheet of substantially fluorine substituted alkyl polymer, and in particular, formed of a poly-hexfluoroethylene composition commonly referred to as Teflon in concurrence with the composition of resilient pad members 34. Additionally, resilient insert damper member 42 is loosely fitted within bore 20 and not necessarily bonded thereto. As can be seen in FIG. 2, resilient insert damper member 42 may be a single Teflon sheet having slit 44 formed therethrough in longitudinal direction 16. The important consideration of resilient insert damper member 42 being that such be flexible and contacting at least one point on the internal sidewall 22 of piston member 18. The thickness of resilient insert damper member 42 may be within the approximating range of 0.005-0.050 inches in a manner similar to that provided for resilient pad member 34.

Thus, there is provided a mechanism for reducing audio output in the form of resilient pad members 34 and resilient insert damper members 42 when friction pad 14 is longitudinally displaced into force contact with rotor or disc member 12. The reducing audio output mechanism 34 and 42 is located at least partially within bore 20 of piston member 18.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A disc pad brake system for longitudinally displacing at least one friction pad into force contact with a rotatively displaceable rotor member, comprising:
   (a) at least one piston member having a bore, said piston member being reversibly longitudinally displaceable for displacing said friction pad into contact with said rotating rotor member;
   (b) at least one carrier plate member having opposing first and second surfaces, said first surface of said carrier plate member being coupled to said friction pad; and,
   (c) at least one resilient pad member formed of a substantially fluorine substituted alkyl polymer, displaceably secured to said surface of said carrier plate member, said resilient pad member haivng a dome shaped portion defining an apex section which at least partially extends into said bore of said piston member, said piston member for contacting said resilient pad member when said piston member is actuated in said longitudinal direction.

2. The disc pad brake system as recited in claim 1 where said resilient pad member is formed of a poly-hexfluoroethylene composition.

3. The disc pad brake system as recited in claim 2 where said resilient pad member includes a thickness in the approximate range of 0.005–0.050 inches.

4. The disc pad brake system as recited in claim 1 where said resilient pad member is initially adhesively bonded to said second surface of said second surface of said carrier plate member.

5. The disc pad brake system as recited in claim 4 where said resilient pad member is compressed against said second surface of said carrier plate member in a contour substantially coinciding with a sidewall contour of said piston member, said piston member sidewall contour defining an inner portion of said resilient pad member.

6. The disc pad brake system as recited in claim 5 where said substantially dome shaped portion of said resilient pad member is substantially out of contact with said carrier plate member.

7. The disc pad brake system as recited in claim 1 including a resilient annular insert damper member insertable within said bore of said piston member.

8. The disc pad brake system as recited in claim 7 where said resilient insert damper member releaseably and contiguously contacts a sidewall of said piston member within said bore formed therein.

9. The disc pad brake system as recited in claim 8 where said resilient insert damper member is formed of a substantially fluorine substituted alkyl polymer.

10. The disc pad brake system as recited in claim 9 where said resilient insert damper member is formed of a poly-hexfluoroethylene composition.

11. A disc pad brake system for longitudinally displacing at least one friction pad into force contact with a rotatively displaceable rotor member, comprising:
(a) at least one piston member having a bore, said piston member being reversibly longitudinally displaceable for displacing said friction pad into contact with said rotating rotor member;
(b) at least one carrier plate member having opposing first and second surfaces, said first surface of said carrier plate member ring coupled to said friction pad; and,
(c) means for reducing audio output when said friction pad is displaced into force contact with said rotor member, said reducing audio output means being located at least partially within said bore of said piston member, said means for reducing said audio output being formed of a substantially fluorine substituted aklyl polymer.

12. The disc pad brake system as recited in claim 11 where said means for reducing audio output includes:
(a) at least one resilient pad member displaceably secured to said second surface of said carrier plate member; and,
(b) a resilient insert damper member insertable within said bore of said piston member.

13. The disc pad brake system as recited in claim 12 where said resilient pad member includes a substantially dome shaped portion at least partially insertable within said bore of said piston member.

14. The disc pad brake system as recited in claim 13 where said resilient pad member dome shaped portion is substantially displaced from said second surface of said carrier plate member.

15. The disc pad brake system as recited in claim 12 where said resilient insert damper member is in releasable contact with an inner surface of said piston member.

16. The disc pad brake system as recited in claim 11 where said resilient pad member and said resilient insert damper member are formed of a poly-hexfluoroethylene composition.

17. The disc pad brake system as recited in claim 11 where each of said resilient pad member and said resilient insert damper member includes a thickness in the approximate range of 0.005 to 0.050 inches.

* * * * *